(12) United States Patent
Sirotich et al.

(10) Patent No.: US 8,400,415 B2
(45) Date of Patent: Mar. 19, 2013

(54) INTERACTIVE INPUT SYSTEM AND BEZEL THEREFOR

(75) Inventors: Roberto A. L. Sirotich, Calgary (CA); Wallace I. Kroeker, Calgary (CA); Joyce He, Calgary (CA); Joe Wright, Calgary (CA); Sean Thompson, Calgary (CA)

(73) Assignee: SMART Technologies ULC (CA)

( * ) Notice: Subject to any disclaimer, the term of this patent is extended or adjusted under 35 U.S.C. 154(b) by 0 days.

(21) Appl. No.: 12/894,964

(22) Filed: Sep. 30, 2010

(65) Prior Publication Data

US 2011/0128219 A1 Jun. 2, 2011

Related U.S. Application Data

(63) Continuation of application No. 12/629,008, filed on Dec. 1, 2009.

(51) Int. Cl.
*G06F 3/041* (2006.01)
(52) U.S. Cl. .......................... 345/173; 345/156; 345/177
(58) Field of Classification Search .......... 345/156–179; 178/18.01–20.04; 277/654
See application file for complete search history.

(56) References Cited

U.S. PATENT DOCUMENTS

| 5,317,140 | A  | * | 5/1994  | Dunthorn ....................... 250/221 |
| 6,335,724 | B1 | * | 1/2002  | Takekawa et al. ............ 345/173 |
| 6,411,287 | B1 | * | 6/2002  | Scharff et al. ................. 345/177 |
| 6,492,633 | B2 | * | 12/2002 | Nakazawa et al. ............ 250/221 |
| 6,498,602 | B1 | * | 12/2002 | Ogawa .......................... 345/173 |
| 6,803,906 | B1 | * | 10/2004 | Morrison et al. ............. 345/173 |
| 7,456,824 | B2 | * | 11/2008 | Yoshimura .................... 345/173 |
| 7,619,617 | B2 | * | 11/2009 | Morrison et al. ............. 345/173 |
| 7,643,006 | B2 | * | 1/2010  | Hill et al. ...................... 345/156 |
| 7,692,625 | B2 | * | 4/2010  | Morrison et al. ............. 345/156 |
| 7,781,722 | B2 | * | 8/2010  | Lieberman et al. ........... 250/221 |
| 7,855,716 | B2 | * | 12/2010 | McCreary et al. ............ 345/173 |
| 7,907,124 | B2 | * | 3/2011  | Hillis et al. ................... 345/173 |
| 2001/0019325 | A1 | * | 9/2001 | Takekawa ..................... 345/157 |
| 2001/0022579 | A1 | * | 9/2001 | Hirabayashi .................. 345/175 |
| 2005/0077452 | A1 | * | 4/2005 | Morrison et al. ............. 250/221 |

* cited by examiner

*Primary Examiner* — William Boddie
*Assistant Examiner* — Mansour M Said
(74) *Attorney, Agent, or Firm* — Katten Muchin Rosenman LLP

(57) ABSTRACT

An interactive input system comprises at least one imaging device having a field of view looking into a region of interest. At least one radiation source emits radiation into the region of interest. A pliable bezel at least partially surrounds the region of interest. The pliable bezel has a reflective surface in the field of view of said at least one imaging device.

48 Claims, 12 Drawing Sheets

INTERACTIVE INPUT SYSTEM AND BEZEL THEREFOR

This application is a continuation of U.S. patent application Ser. No. 12/629,008, filed Dec. 1, 2009, the contents of which are incorporated herein by reference

FIELD OF THE INVENTION

The present invention relates generally to interactive input systems and to a bezel therefor.

BACKGROUND OF THE INVENTION

Interactive input systems that allow users to inject input (e.g., digital ink, mouse events etc.) into an application program using an active pointer (e.g., a pointer that emits light, sound or other signal), a passive pointer (e.g., a finger, cylinder or other suitable object) or other suitable input device such as for example, a mouse, trackball or interactive tablet, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); touch-enabled laptop PCs; personal digital assistants (PDAs); and other similar devices.

Above-incorporated U.S. Pat. No. 6,803,906 to Morrison, et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking generally across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

To enhance the ability to detect and recognize passive pointers brought into proximity of a touch surface in touch systems employing machine vision technology, it is known to employ illuminated bezels to illuminate generally evenly the region over the touch surface. For example, U.S. Pat. No. 6,972,401 to Akitt, et al. assigned to SMART Technologies ULC, discloses an illuminated bezel for use in a touch system such as that described in above-incorporated U.S. Pat. No. 6,803,906. The illuminated bezel emits infrared red or other suitable radiation over the touch surface that is visible to the digital cameras. As a result, in the absence of a passive pointer in the fields of view of the digital cameras, the illuminated bezel appears in captured images as a continuous bright or "white" band. When a passive pointer is brought into the fields of view of the digital cameras, the passive pointer occludes emitted radiation and appears as a dark region interrupting the bright or "white" band in captured images allowing the existence of the pointer in the captured images to be readily determined and its position triangulated. Although this illuminated bezel is effective, it is expensive to manufacture and can add significant cost to the overall touch system. It is therefore not surprising that alternative techniques to illuminate the region over touch surfaces have been considered.

U.S. Pat. No. 7,283,128 to Sato discloses a coordinate input apparatus including a light-receiving unit arranged in the coordinate input region, a retroreflecting unit arranged at the peripheral portion of the coordinate input region to reflect incident light and a light-emitting unit which illuminates the coordinate input region with light. The retroreflecting unit is a flat tape and includes a plurality of triangular prisms each having an angle determined to be equal to or less than the detection resolution of the light-receiving unit. Angle information corresponding to a point which crosses a predetermined level in a light amount distribution obtained from the light receiving unit is calculated. The coordinates of the pointer position are calculated on the basis of a plurality of pieces of calculated angle information, the angle information corresponding to light emitted by the light-emitting unit that is reflected by the pointer.

Although the use of the retroreflecting unit to reflect and direct light into the coordinate input region is less costly than employing illuminated bezels, problems with such a retroreflecting unit exist. The amount of light reflected by the retroreflecting unit is dependent on the incident angle of the light. As a result, the Sato retroreflecting unit works best when the light is normal to its retroreflecting surface. However, when the angle of incident light on the retroreflecting surface becomes larger, the performance of the retroreflecting unit degrades resulting in uneven illumination of the bezel surrounding the coordinate input region. As a result, the possibility of false pointer contacts and/or missed pointer contacts is increased. Furthermore, prior retroreflective systems require relatively rigid bezels typically constructed of an inflexible material. For systems that must be portable, for example, in a military environment, these prior art systems are unsuitable. As will be appreciated, improvements in illumination for machine vision interactive input systems are desired.

It is therefore an object of the present invention to provide a novel interactive input system and bezel therefor.

SUMMARY OF THE INVENTION

Accordingly, in one aspect there is provided an interactive input system comprising at least one imaging device having a field of view looking into a region of interest; at least one radiation source emitting radiation into said region of interest; and a pliable bezel at least partially surrounding said region of interest, said pliable bezel having a surface in the field of view of said at least one imaging device.

According to another aspect there is provided a interactive input system comprising at least one imaging device having a field of view looking into a region of interest; and a pliable bezel at least partially surrounding said region of interest, said a bezel having a surface in the field of view of said at least one imaging device.

BRIEF DESCRIPTION OF THE DRAWINGS

Embodiments will now be described more fully with reference to the accompanying drawings in which.

DETAILED DESCRIPTION OF THE PREFERRED EMBODIMENTS

Figure 1:
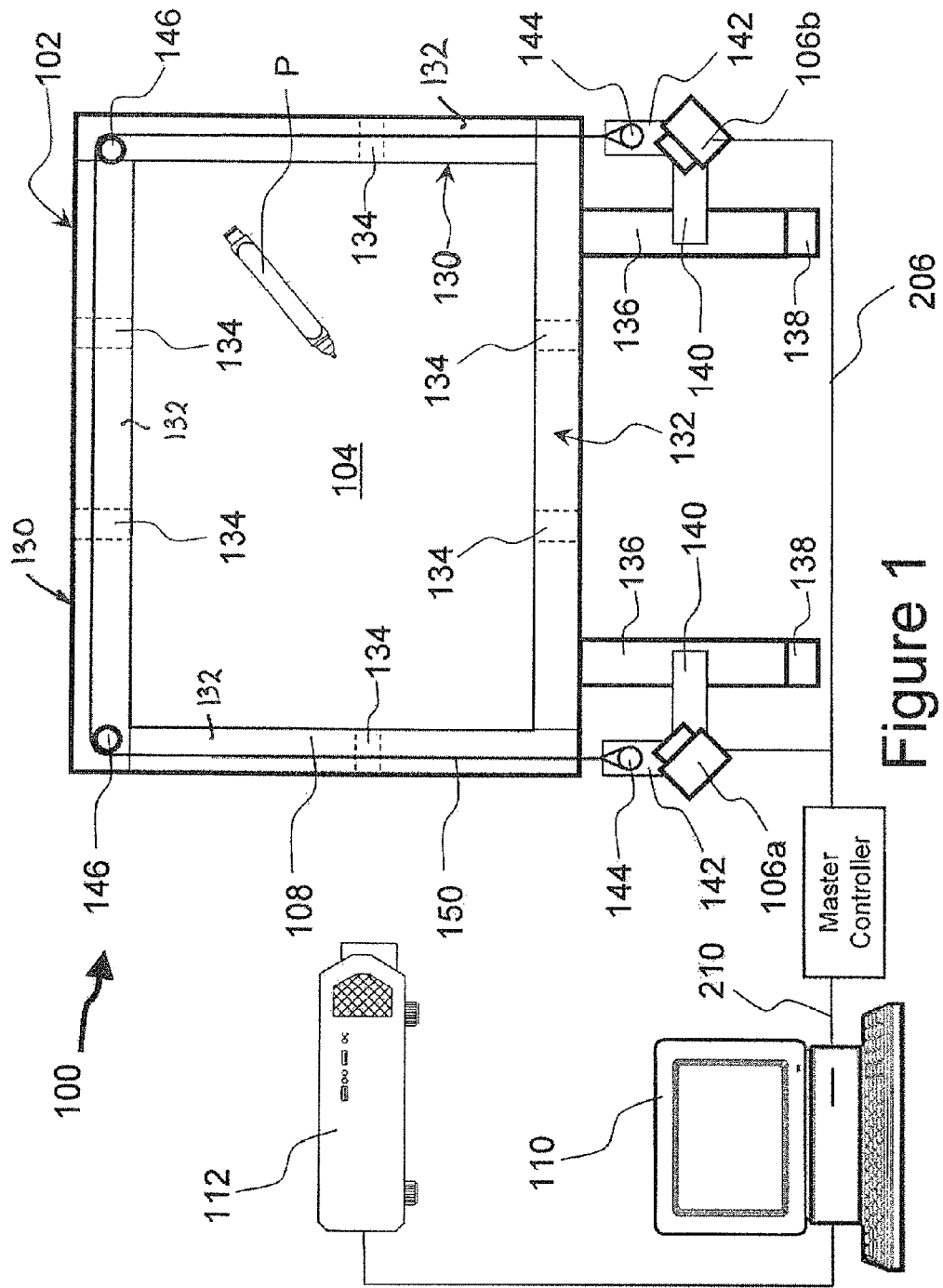
FIG. 1 is a schematic diagram of an interactive input system comprising a pliable bezel.

Turning now to FIG. 1, an interactive input system that allows a user to inject input such as digital ink, mouse events etc. into an application program is shown and is generally identified by reference numeral 100. In this embodiment, interactive input system 100 comprises a support frame assembly 102 that surrounds a touch surface 104. Imaging devices 106a and 106b are mounted on the support frame assembly 102 and look generally across the touch surface 104 from different vantages to detect pointers brought into proximity with the touch surface 104. The imaging devices 106a and 106b communicate with a master controller 108, which in turn communicates with a general purpose computing device 110 executing one or more application programs. General purpose computing device 110 processes the output of the master controller 108 and provides display image output to a projection device 112. Projection device 112 in turn projects an image onto the touch surface 104 that reflects pointer activity. In this manner, the imaging devices 106a and 106b, master controller 108, general purpose computing device 110 and projection device 112 allow pointer activity proximate to the touch surface 104 to be recorded as writing or drawing or used to the control execution of one or more application programs executed by the general purpose computing device 110.

The support frame assembly 102 in this embodiment comprises four frame sections 130 that are mechanically fastened together adjacent their ends to form a generally rectangular support structure for the touch surface 104. Each frame section 130 comprises a plurality of frame segments 132 with adjacent frame segments 132 being joined by a lockable hinge 134. In this manner, when the support frame assembly 102 is disassembled, the frame sections 130 can be collapsed for ease of transport and storage. Legs 136 extend from the bottom frame sections 130 at laterally spaced locations and terminate at feet 138. The feet 138 extend forwardly and rearwardly of the legs 136 by sufficient lengths so that the support frame assembly 102 is self supporting. Braces (not shown) interconnect the legs 136 and feet 138 to provide additional support. An L-shaped bracket 140 is fastened to each leg 136 intermediate its length. Each bracket 140 supports a respective one of the imaging devices 106a and 106b. In this manner, the imaging devices 106a and 106b look upwardly across the touch surface 104 generally from opposite bottom corners of the touch surface. Each bracket 140 also supports a bezel retainer 142. Each bezel retainer 142 comprises a forwardly extending post 144. The touch surface 104 is a sheet of flexible material that is securely fastened to the back of the support frame assembly 102.

Figure 2:
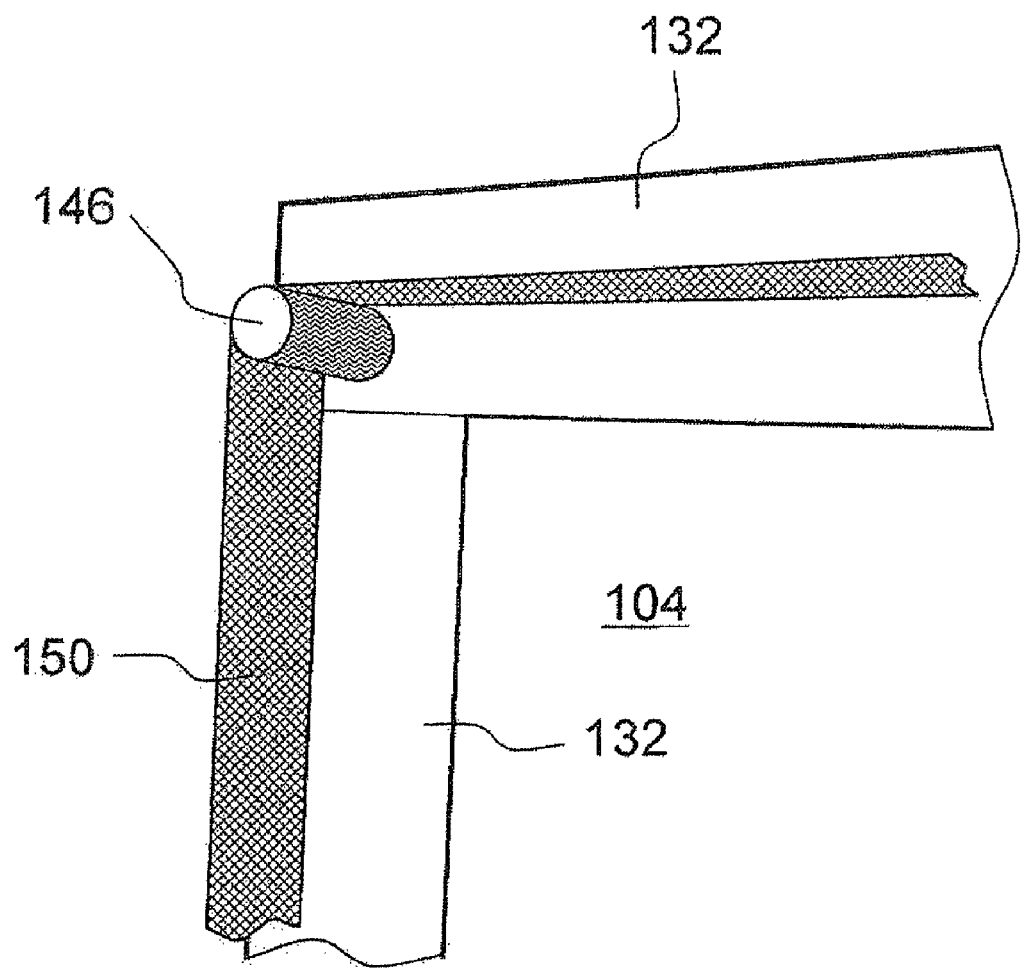
FIG. 2 is a perspective view of a corner portion of the interactive input system of FIG. 1 showing the pliable bezel wrapped partially around a bezel guide that projects from a support frame assembly.

Bezel guides 146 extend forwardly from the support frame assembly 102 adjacent the opposite top corners of the touch surface 104. FIG. 2 better illustrates one of the bezel guides 146. In this embodiment, each bezel guide 146 is in the form of a cylindrical metal rod that is secured to the associated support frame section 130 by one or more suitable fasteners (not shown). The outer surface of each metal rod is coated with a retro-reflective surface. A pliable bezel 150 extends along three sides of the touch surface. The bezel 150 partially wraps around each of the bezel guides 146 and has its opposite ends held by the bezel retainers 142. In this embodiment, the ends of the bezel 150 terminate in loops into which the posts 144 are inserted. The length of the bezel 150 is chosen so that the bezel 150 remains taut.

The bezel 150 in this embodiment is in the form of a strap formed from a synthetic fabric such as for example nylon. The strap has a length that is significantly larger than its width. The bezel 150 has an inwardly facing surface that is also coated with retro-reflective material. To take best advantage of the properties of the retro-reflective material, the bezel 150 is oriented so that its inwardly facing surface extends in a plane generally normal to that of the touch surface 104.

The imaging device 106a positioned adjacent the bottom left corner of the touch surface 104 is oriented so that it sees the inwardly facing surface of the portion of the bezel 150 that extends between the two bezel guides 146 and between the bezel guide 150 adjacent the top right corner of the touch surface 104 and the bezel retainer 142 adjacent the bottom right corner of the touch surface 104. Similarly, the imaging device 106b positioned adjacent the bottom right corner of the touch surface 104 is oriented so that it sees the inwardly facing surface of the portion of the bezel 150 that extends between the two bezel guides 146 and between the bezel guide 150 adjacent the top left corner of the touch surface 104 and the bezel retainer 142 adjacent the bottom left corner of the touch surface 104. In this manner, the fields of view of the imaging devices 106a and 106b overlap over a region of interest encompassing the entirety of the touch surface 104.

Figure 3:
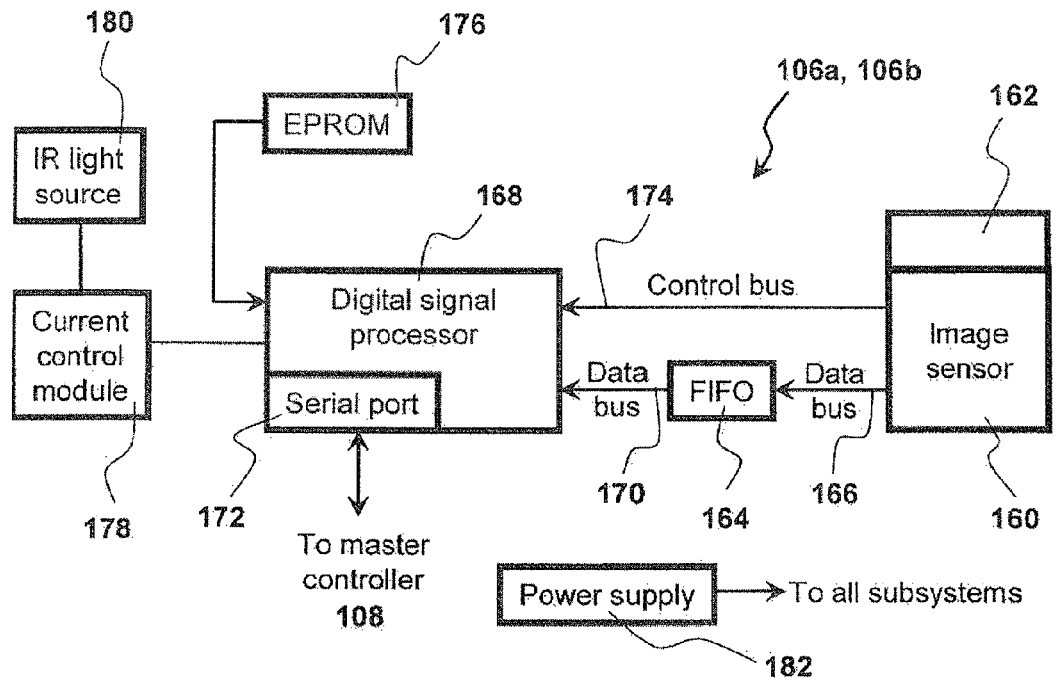
FIG. 3 is a schematic block diagram of an imaging assembly forming part of the interactive input system of FIG. 1.

Turning now to FIG. 3, one of the imaging assemblies 106a and 106b is better illustrated. As can be seen, the imaging assembly comprises an image sensor 160 such as that manufactured by Micron Technology, Inc. of Boise, Id. under model no. MT9V022 fitted with an 880 nm lens 162 of the type manufactured by Boowon Optical Co. Ltd. under model no. BW25B. The lens 162 provides the image sensor 160 with a field of view that is sufficiently wide so that pointer contacts at any position on the touch surface 104 are seen by the image sensor 160. The image sensor 160 communicates with and outputs image frame data to a first-in first-out (FIFO) buffer 164 via a data bus 166. A digital signal processor (DSP) 168 receives the image frame data from the FIFO buffer 164 via a second data bus 170 and provides pointer data to the master controller 108 via a serial input/output port 172 when a pointer exists in image frames captured by the image sensor 160. The image sensor 160 and DSP 168 also communicate over a bi-directional control bus 174. An electronically programmable read only memory (EPROM) 176 which stores image sensor calibration parameters is connected to the DSP 168. A current control module 178 is also connected to the DSP 168 as well as to an infrared (IR) light source 180 comprising one or more IR light emitting diodes (LEDs). The configuration of the LEDs of the IR light source 180 is selected to generally evenly illuminate the portion of the bezel 150 in field of view of the imaging assembly. The imaging assembly components receive power from a power supply 182.

Figure 4:
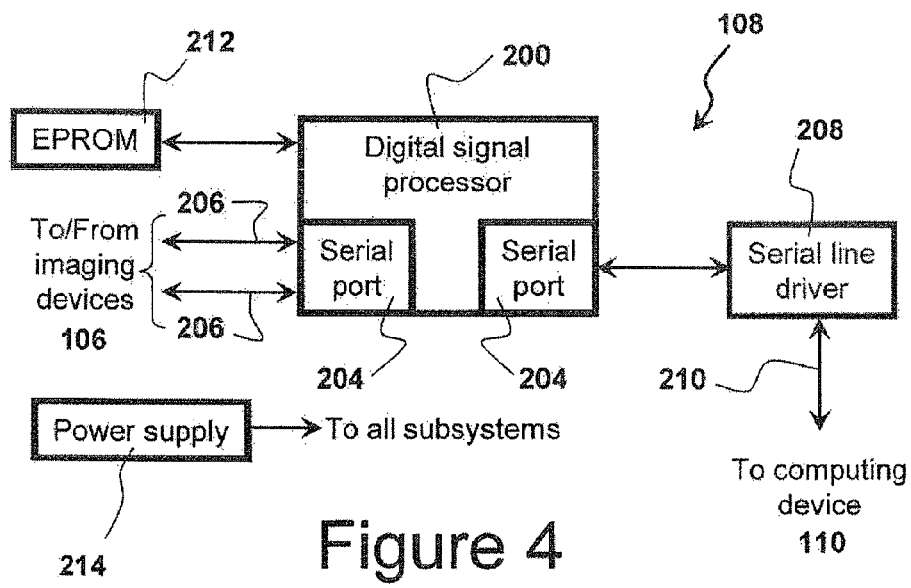
FIG. 4 is a schematic block diagram of a master controller forming part of the interactive input system of FIG. 1.

FIG. 4 better illustrates the master controller 108. Master controller 108 comprises a DSP 200 having a first serial input/output port 202 and a second serial input/output port 204. The master controller 108 communicates with the imaging assemblies 106a and 106b via first serial input/output port 202 over communication lines 206. Pointer data received by the DSP 200 from the imaging assemblies 106a and 106b is processed by DSP 200 to generate pointer location data as will be described. DSP 200 communicates with the general purpose computing device 110 via the second serial input/output port 204 and a serial line driver 208 over communication lines 210. Master controller 108 further comprises an EPROM 212 that stores interactive input system parameters. The master controller components receive power from a power supply 214.

The general purpose computing device 110 in this embodiment is a computer comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The computer can include a network connection to access shared or remote drives, one or more networked computers, or other networked devices.

The interactive input system 100 is able to detect passive pointers P such as for example, a user's finger, a cylinder or other suitable object as well as active pen tools P that are brought into proximity with the touch surface 104 and within the fields of view of the imaging devices 106a and 106b. For ease of discussion, the operation of the interactive input system 100, when a passive pointer P is brought into proximity with the touch surface 104, will be described.

During operation, the DSP 168 of each imaging assembly 106a and 106b generates clock signals so that the image sensor 160 of each imaging assembly captures image frames at the desired frame rate. The DSP 168 also signals the current control module 178 of each imaging assembly 106a and 106b. In response, each current control module 178 connects its associated IR light source 180 to the power supply 182. When the IR light sources 180 are on, the IR light sources 180 flood the region of interest over the touch surface 104 with infrared illumination. When the infrared illumination emitted by the IR light source 180 of imaging assembly 106a impinges on the portion of the bezel 150 and the bezel guides 146 within the field of view of its associated image sensor 160, the retro-reflective material coating the inwardly facing surface of the bezel 150 and coating the bezel guides 146 reflects the infrared illumination back towards the image sensor 160. Likewise, when the infrared illumination emitted by the IR light source 180 of imaging assembly 106b impinges on the portion of the bezel 150 and the bezel guides 146 within the field of view of its associated image sensor 160, the retro-reflective material coating the inwardly facing surface of the bezel 150 and coating the bezel guides 146 reflects the infrared illumination back towards the image sensor 160. As a result, in the absence of a pointer P within the fields of view of the image sensors 160, the bezel 150 appears as a bright "white" band having a substantially even intensity over its length in image frames captured by the imaging assemblies 106a and 106b.

When a pointer P is brought into proximity with the touch surface 104, the pointer P occludes infrared illumination from impinging on the retro-reflective material coating the inwardly facing surface of the bezel 150 and/or bezel guide 146 and as a result, a dark region interrupting the bright band that represents the pointer P, appears in image frames captured by the imaging assemblies 106a and 106b.

Each image frame output by the image sensor 160 of each imaging assembly 106a and 106b is conveyed to the DSP 168. When the DSP 168 receives an image frame, the DSP 168 processes the image frame to detect the existence of a pointer therein and if a pointer exists, generates pointer data that identifies the position of the pointer within the image frame. The DSP 168 then conveys the pointer data to the master controller 108 via serial port 172 and communication lines 206.

When the master controller 108 receives pointer data from both imaging assembles 106a and 106b, the master controller 108 calculates the position of the pointer in (x,y) coordinates relative to the touch surface 104 using well known triangulation such as that described in above-incorporated U.S. Pat. No. 6,803,906 to Morrison, et al. The calculated pointer position is then conveyed by the master controller 108 to the general purpose computing device 110. The general purpose computing device 110 in turn processes the received pointer position and updates the image data output provided to the projection device 112, if required, so that the image presented on the touch surface 104 can be updated to reflect the pointer activity. In this manner, pointer interaction with the touch surface 104 can be recorded as writing or drawing or used to control execution of one or more application programs running on the general purpose computing device 110.

Figure 5A:
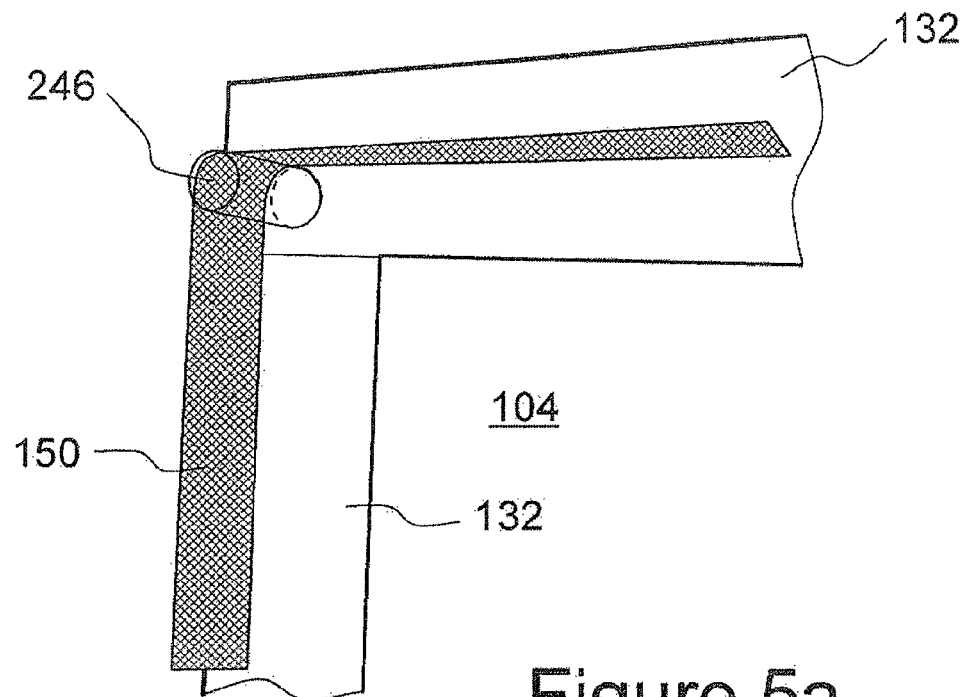
FIG. 5a is a perspective view of the corner portion of FIG. 2 showing the pliable bezel wrapped partially around an alternative bezel guide that projects from the support frame assembly.

Although the bezel guides 146 are described above as being in the form of generally cylindrical metal rods coated with retro-reflective material, alternatives are available. For example, FIG. 5a shows an alternative bezel guide 246 extending forwardly from the support frame assembly 102. In this embodiment, similar to the previous embodiment, the bezel guide 246 is in the form of a generally cylindrical rod secured to the associated frame section 130 by one or more suitable fasteners. The cylindrical rod however is formed of transparent material, such as for example glass or acrylic. In this manner, infrared illumination that is emitted by the IR light sources 180 passes through the bezel guide 246 and impinges on the bezel 150 that is partially wrapped around the bezel guide. The infrared illumination in turn is reflected by the retro-reflective material coating on the inwardly facing surface of the bezel 150, back through the bezel 246 guide and toward to the imaging devices 106a and 106b.

Figure 5B:
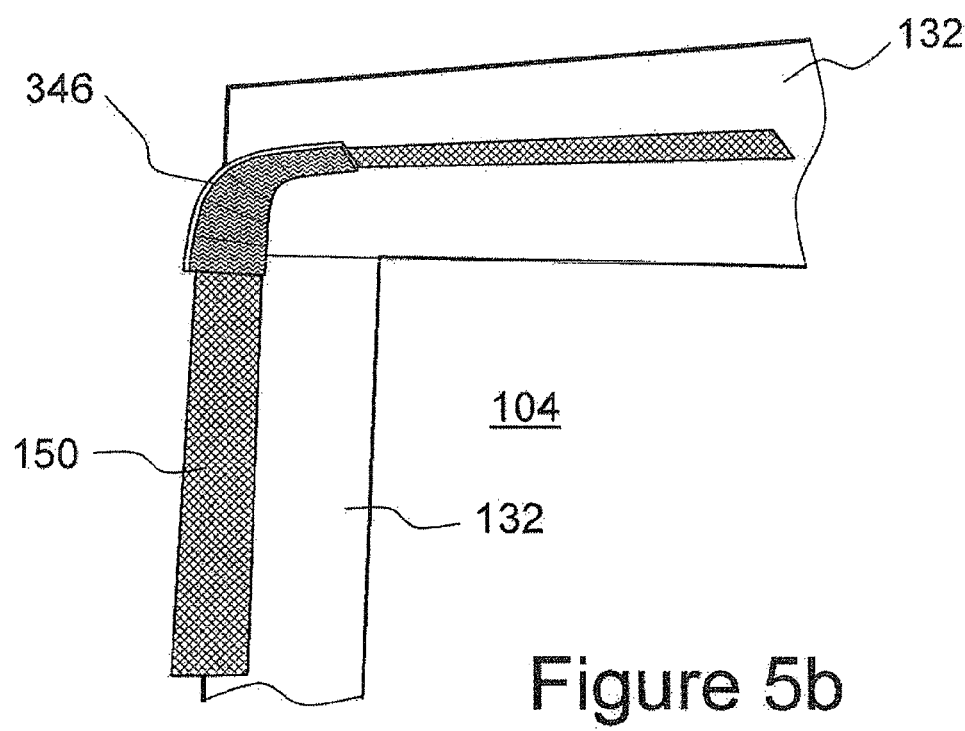
FIG. 5b is a perspective view of the corner portion of FIG. 2 showing the pliable bezel wrapped partially around yet another alternative bezel guide that projects from the support frame assembly.

FIG. 5b show yet another alternative bezel guide 346 extending forwardly from the support frame assembly 102. In this embodiment, the bezel guide 246 is in the form of a curved member secured to the associated frame section 130 by one or more suitable fasteners. Similar to the bezel guide 146, the inwardly facing surface of the curved member is coated with retro-reflective material. In this manner, infrared illumination that is emitted by the IR light sources 180 and impinges on the bezel guide 346 is reflected by the retro-reflective material coating back toward to the imaging devices 106a and 106b.

Figure 5C:
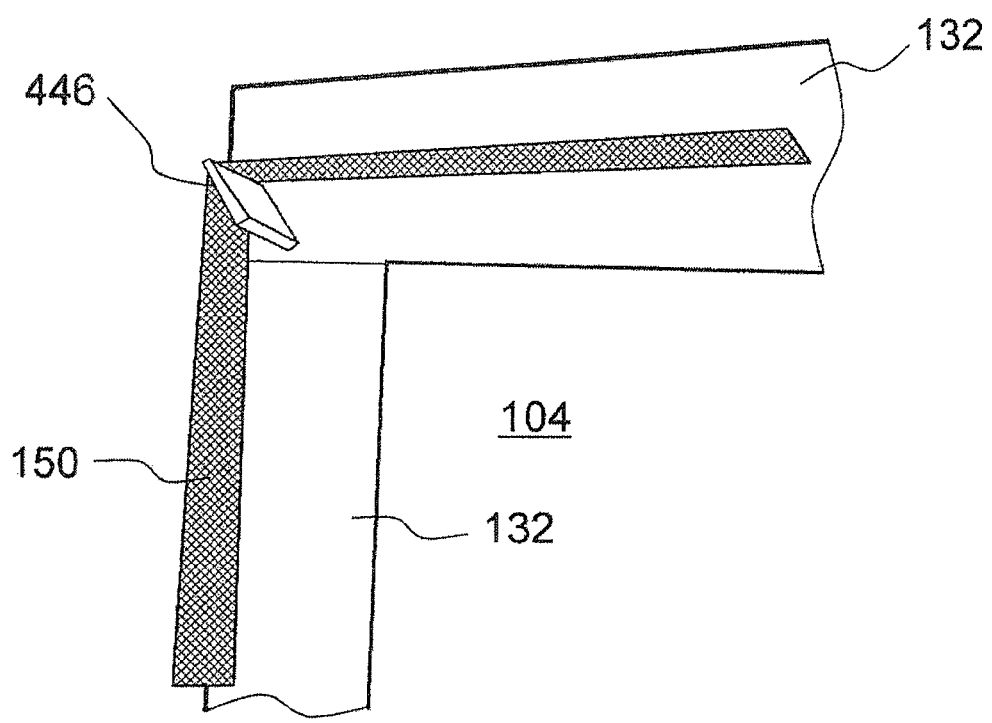
FIG. 5c is a perspective view of the corner portion of FIG. 2 showing the pliable bezel wrapped partially around yet another alternative bezel guide that projects from the support frame assembly.

FIG. 5c show still yet another alternative bezel guide 446 extending forwardly from the support frame assembly 102. In this embodiment, the bezel guide 446 is in the form of a thin, generally rectangular projection secured to the associated frame section 130 by one or more suitable fasteners. The configuration of the bezel guide 446 is such that its presence does not significantly occlude the bezel 150 during infrared illumination. As a result, the bezel guide 446 does not create a dark line in the white band normally seen by the image sensors 160 in the absence of a pointer P.

Figure 6A:
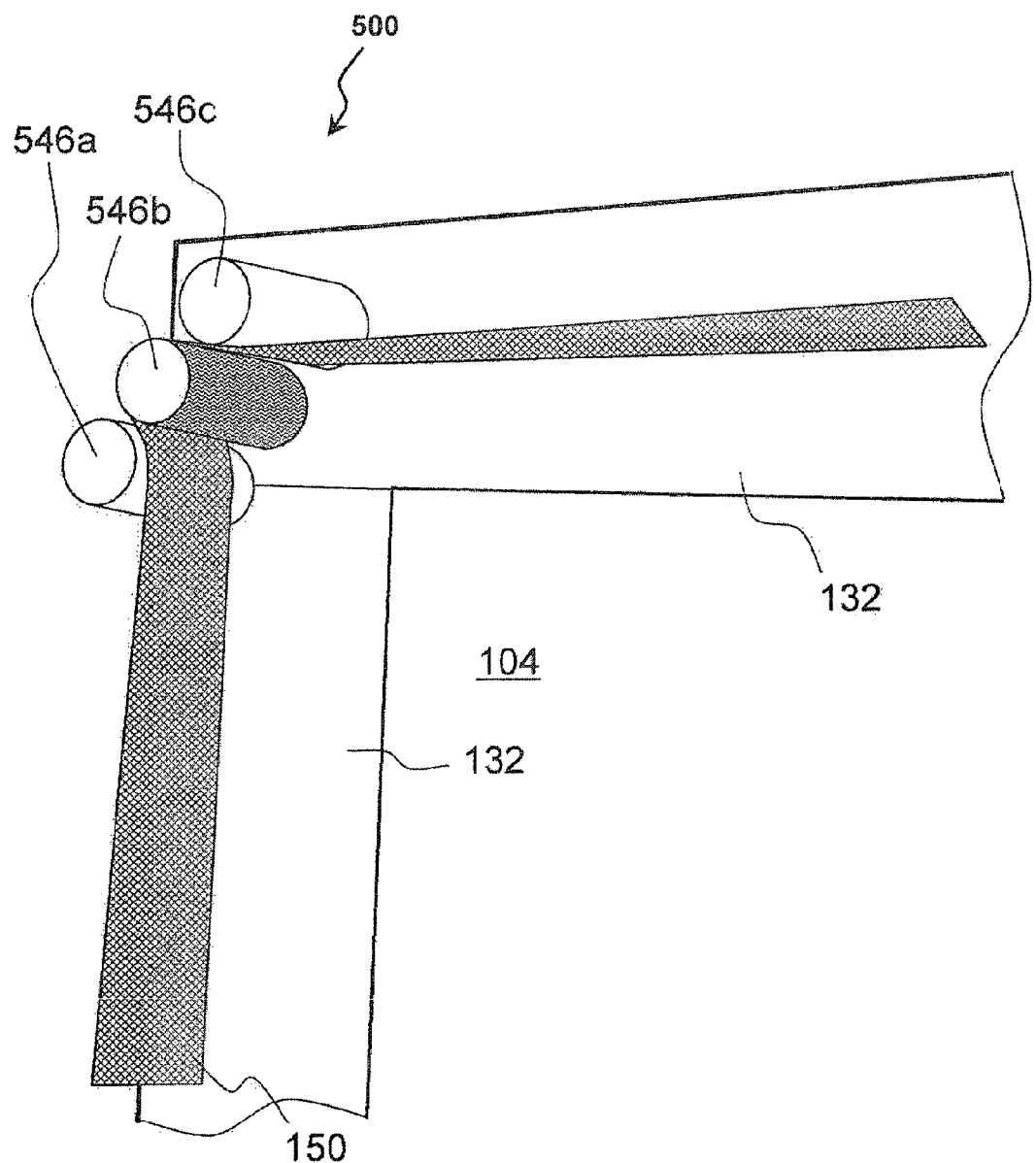
FIG. 6a is a perspective view of the corner portion of FIG. 2 showing the pliable bezel wrapped partially around a bezel guide arrangement comprising a plurality of bezel guides that project from the support frame assembly.

Rather than using a single bezel guide adjacent each top corner of the touch surface 104, bezel guide arrangements comprising a plurality of bezel guides may be employed. For example, FIG. 6a shows a bezel guide arrangement 500 comprising a plurality of bezel guides 546a to 546c, in this case three (3) bezel guides extending forwardly from the support frame assembly 102. In this embodiment, each of the bezel guides is in the form of a cylindrical metal rod that is secured to the associated frame section 130 by one or more suitable fasteners. The outer surface of the central bezel guide 546b is coated with a retro-reflective material. The bezel guides 546a to 546c are arranged in a row and are slightly spaced to provide gaps between adjacent bezel guides. The bezel 150 is interleaved between the bezel guides 546a to 546c. As a result, the bezel 150 is held securely to the support frame assembly 102. Interleaving the bezel 150 through the bezel guides 546a to 546c also helps to reduce slack formation in the bezel 150 and thus, inhibit sagging.

Figure 6B:
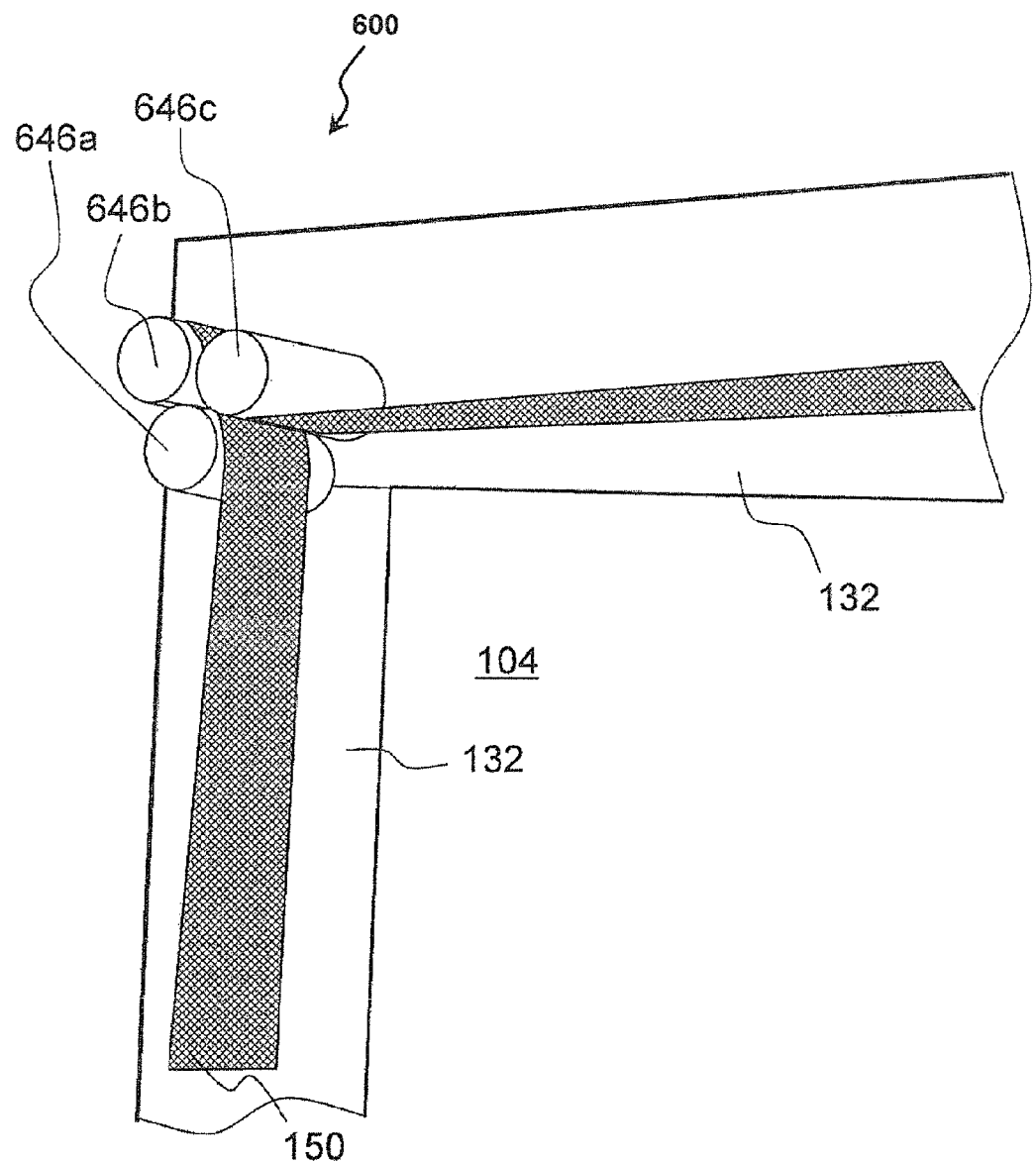
FIG. 6b is a perspective view of the corner portion of FIG. 2 showing the pliable bezel wrapped partially around an alternative bezel guide arrangement comprising a plurality of bezel guides that project from the support frame assembly.

FIG. 6b shows another bezel guide arrangement 600 comprising a plurality of bezel guides 646a to 646c, in this case three (3) bezel guides extending forwardly from the support frame assembly 102. In this embodiment, each of the bezel guides 646a to 646c is also in the form of a cylindrical metal rod that is secured to the associated frame section 130 by one or more suitable fasteners. The bezel guides 646a to 646c are arranged in a triangle and are slightly spaced to provide gaps between adjacent bezel guides. The pliable bezel 150 is interleaved between the bezel guides 646a to 646c in a manner which obviates the need to coat any of the bezel guides with retro-reflective material while still holding the bezel securely to the support frame assembly 102 thereby to inhibit slack formation and sagging.

Figure 7:
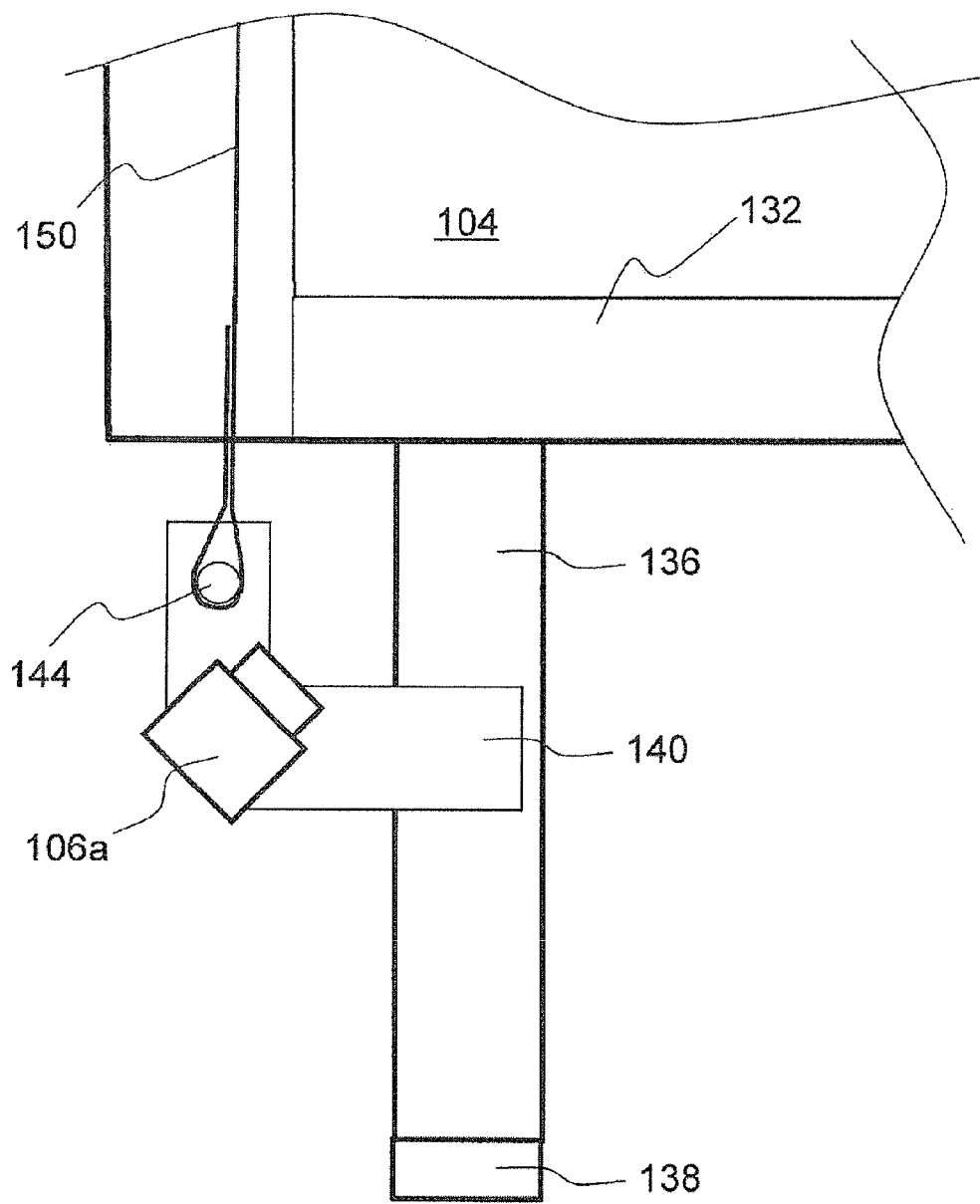
FIG. 7 is a schematic diagram of another portion of the interactive input system of FIG. 1 showing an alternative pliable bezel fastening technique.

In the embodiment of FIG. 1, the bezel 150 is described as having ends that terminate in loops through which the posts 144 of the bezel retainers 142 pass. Alternative bezel configurations are however possible. For example, as shown in FIG. 7, rather than terminating in loops, in this embodiment, hook and loop fabric is provided adjacent one or both ends of the bezel. Each end of the bezel 150 carrying hook and loop fabric is wrapped around the post 144 of the bezel retainer and brought back into contact with itself to engage the hook and loop fabric. The releasable hook and loop fabric allows the tension of the bezel 150 to be adjusted to remove slack and inhibit sagging.

Figure 8:
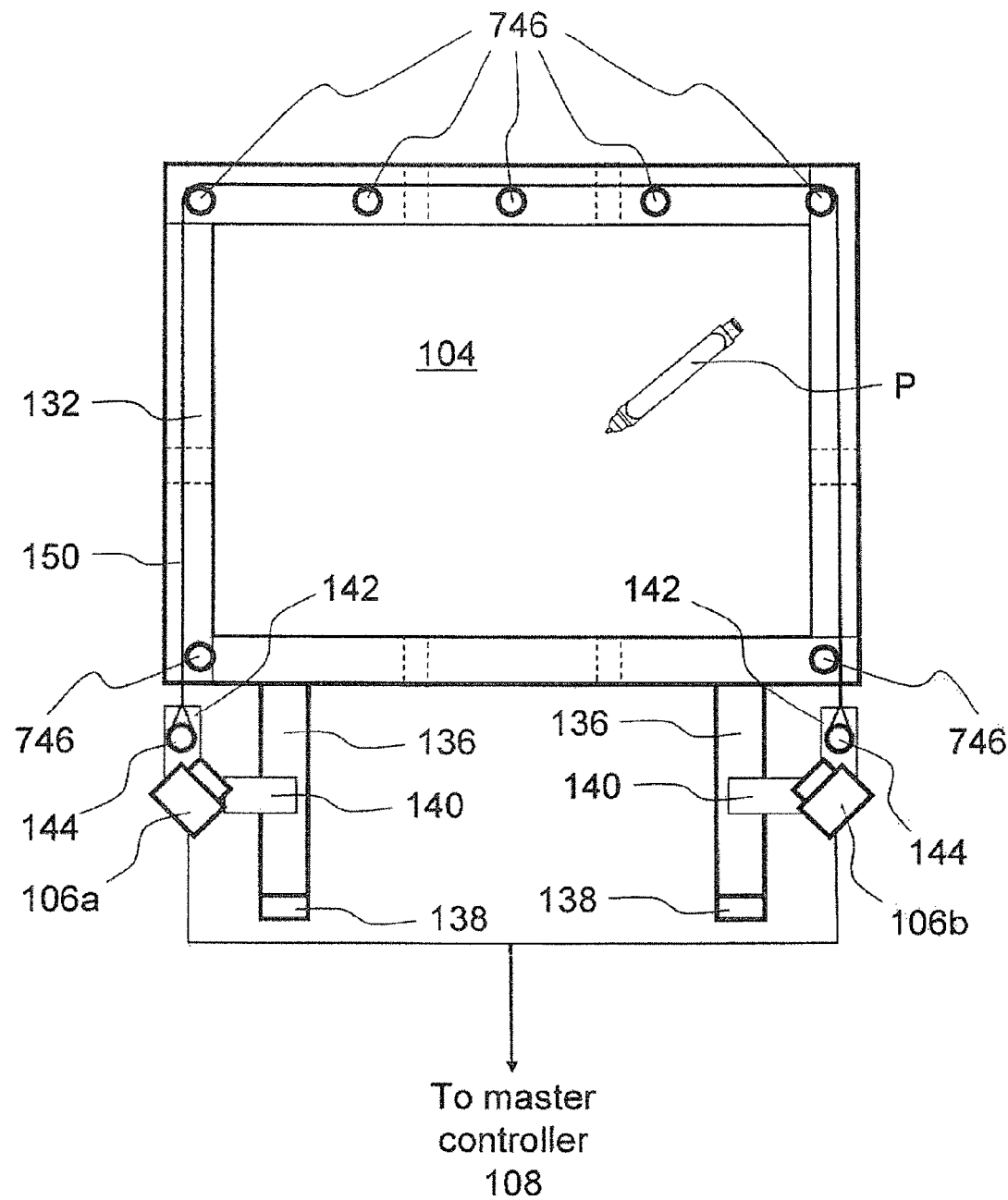
FIG. 8 is a schematic diagram showing an alternative bezel guide configuration for use in the interactive input system of FIG. 1.

Turning now to FIG. 8, an alternative bezel guide configuration for the interactive input system 100 is shown. In this embodiment, rather than only using bezel guides adjacent the top corners of the touch surface 104, bezel guides 746 extending forwardly from the support frame assembly 102 are also employed at spaced locations along the top of the touch surface as well as adjacent the bottom corners of the touch surface 104 to further inhibit slack formation in the bezel 150. Similar to the embodiment of FIG. 1, each bezel guide 746 is in the form of a cylindrical metal rod that is secured to the associated frame section 130 by one or more suitable fasteners. The outer surface of each metal rod is coated with retro-reflective material.

Although the bezel is described as being formed from synthetic material such as for example nylon, other structurally suitable bezel materials such as for example, ductile metals, plastics, fabrics etc. may be employed. Also, the bezel need not be in the form of a single continuous strap. Rather, the bezel may comprise a plurality of bezel segments arranged end-to-end about the touch surface 104 and/or arranged side-to-side.

If desired, the bezel guides may carry retaining structure to cooperate with and retain the bezel. For example, one or more of the bezel guides may carry hook or loop fabric that cooperates with complimentary fabric on the bezel. Alternatively, one or more of the bezel guides may comprise a clamp or other suitable mechanical fastener to retain the bezel. Also, if desired, the bezel guides may be integrally formed with the frame sections 130 or secured to the frame sections 130 by other suitable means.

Although examples of bezel guide configurations are described above and illustrated, alternative configurations may be employed. For example, each bezel guide may comprise a plurality of flattened prongs extending forwardly from the support frame assembly with the bezel woven through the prongs. Typically, three prongs would be employed. Similar to previous embodiments, the prongs are coated with retroreflective material and are flat to mitigate shadows.

Different bezel retainer configurations are also possible. For example, one or both bezel retainers may comprise a ratchet or lever mechanism that receives a free end of the bezel and allows the tension applied to the bezel to be adjusted. Alternatively, one or both ends of the bezel 150 may be weighted to maintain tension in the bezel. In yet another embodiment, one or both bezel retainers may comprise a buckle and a clasp arrangement such as those commonly employed on knapsacks and other carrying cases. In this case, one of the buckle and clasp is attached to one end of the bezel and the other one of the buckle and clasp is attached to the bracket 140. When the buckle and clasp are engaged, the bezel can be adjusted through a slider loop to allow the tension of the bezel to be adjusted. The bezel may also be formed of elasticized material to assist in maintaining tension in the bezel.

Figure 9:
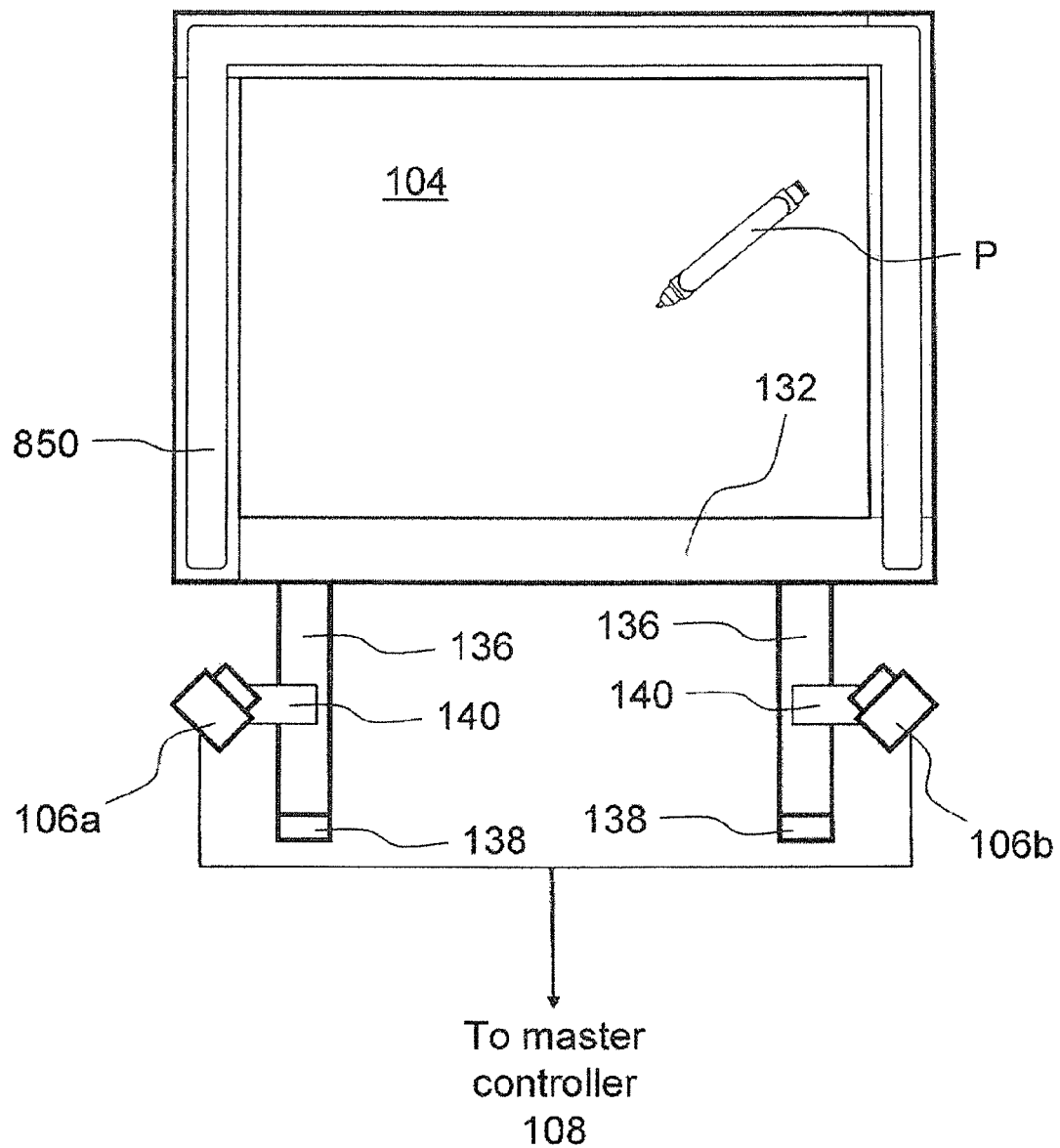
FIG. 9 is a schematic diagram of an interactive input system comprising a pliable inflatable bezel.

Turning now to FIG. 9, an alternative pliable bezel configuration for the interactive input system 100 is shown. In this embodiment, similar to the previous embodiment, the bezel 850 extends along three sides of the touch surface 104. Unlike the previous embodiment however, the bezel 850 is in the form of an inflatable C-shaped element formed of two sheets of an air impermeable plastic coated fabric bonded together. The inwardly facing surface of the bezel 850 is coated with retro-reflective material. The bezel 850 is releasably fastened to the frame sections by suitable means such as for example, cooperating hook and loop fabric carried by the frame sections 130 and the bezel 850 obviating the need for the bezel retainers 142 on the brackets 140. In this manner, the bezel 850 can be easily removed from the frame sections 130 and deflated by opening a valve member (not shown) when not in use. Alternatively, the bezel 850 may be filled with foam as described in U.S. Pat. No. 4,624,877 and U.S. Pat. No. 5,705,252 and be of similar composition to self-inflating mattresses such as the Therm-a-rest™ brand produced by Cascade Designs.

Figure 10:
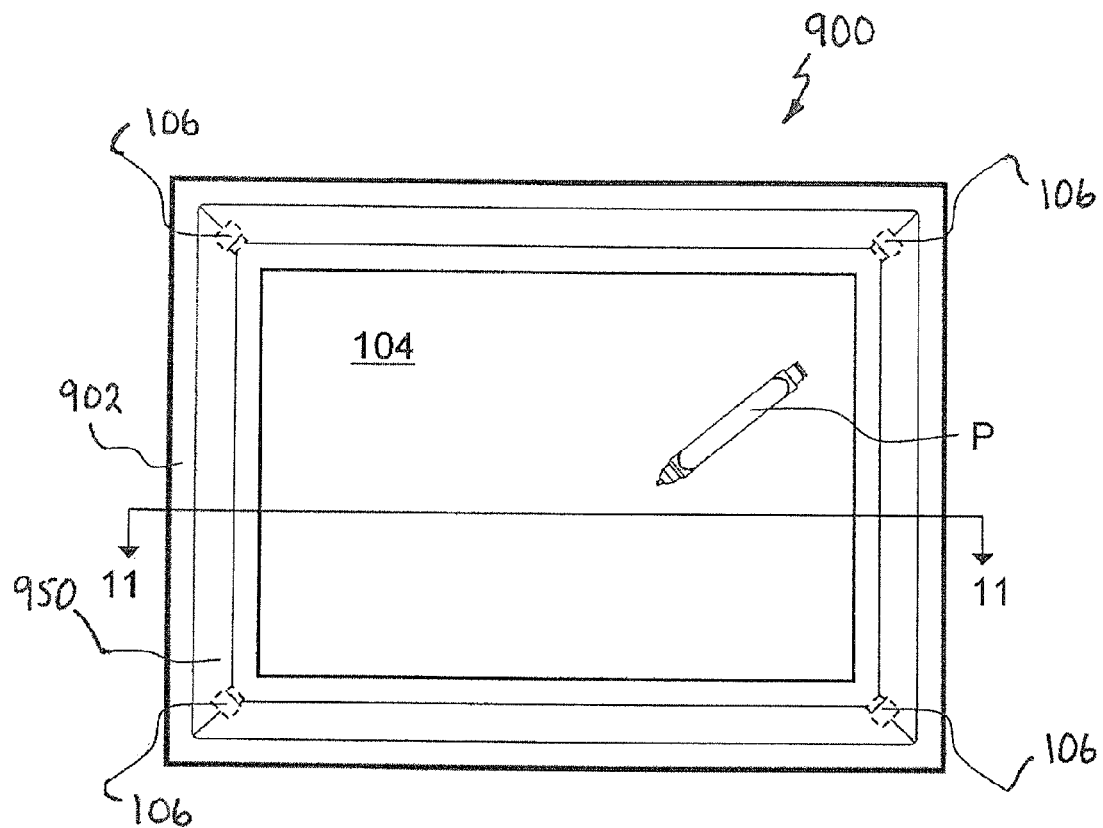
FIG. 10 is a schematic diagram of an interactive input system comprising an alternative pliable inflatable bezel.
Figure 11:
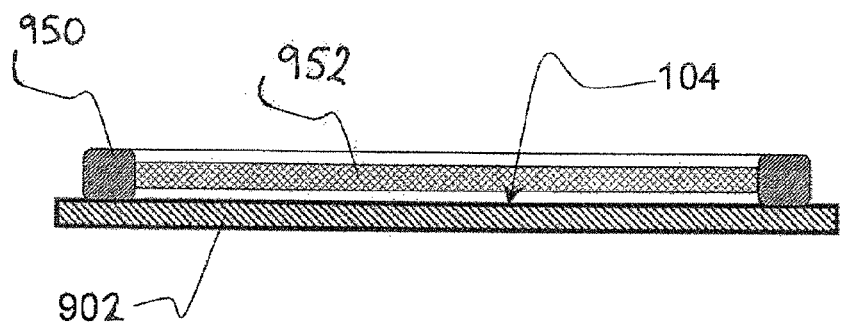
FIG. 11 is a cross-sectional view of FIG. 10 taken along lines 11-11.

FIGS. 10 and 11 show an inflatable bezel and imaging device assembly 900 that is suitable for mounting on virtually any substantially flat surface. In this embodiment, the inflatable bezel and imaging device assembly 900 is secured to the frame 902 of a mobile projection screen by cooperating hook and loop fabric on the assembly 900 and frame 902. The inflatable bezel 950 extends along all four sides of the portion of the frame surface that defines the touch surface 104. Imaging devices 106 are positioned adjacent and accommodated by each corner of the bezel 950. Cables extend from the imaging devices through the assembly to allow the imaging devices to be connected to the master controller 108. The inwardly facing surface of the bezel 950 is coated with retro-reflective material 952. In this embodiment, as the inflatable bezel and imaging device assembly 900 comprises four (4) imaging devices, pointer position coordinates are determined in the manner disclosed in above-incorporated U.S. Pat. No. 6,803,906 to Morrison, et al.

Figure 12:
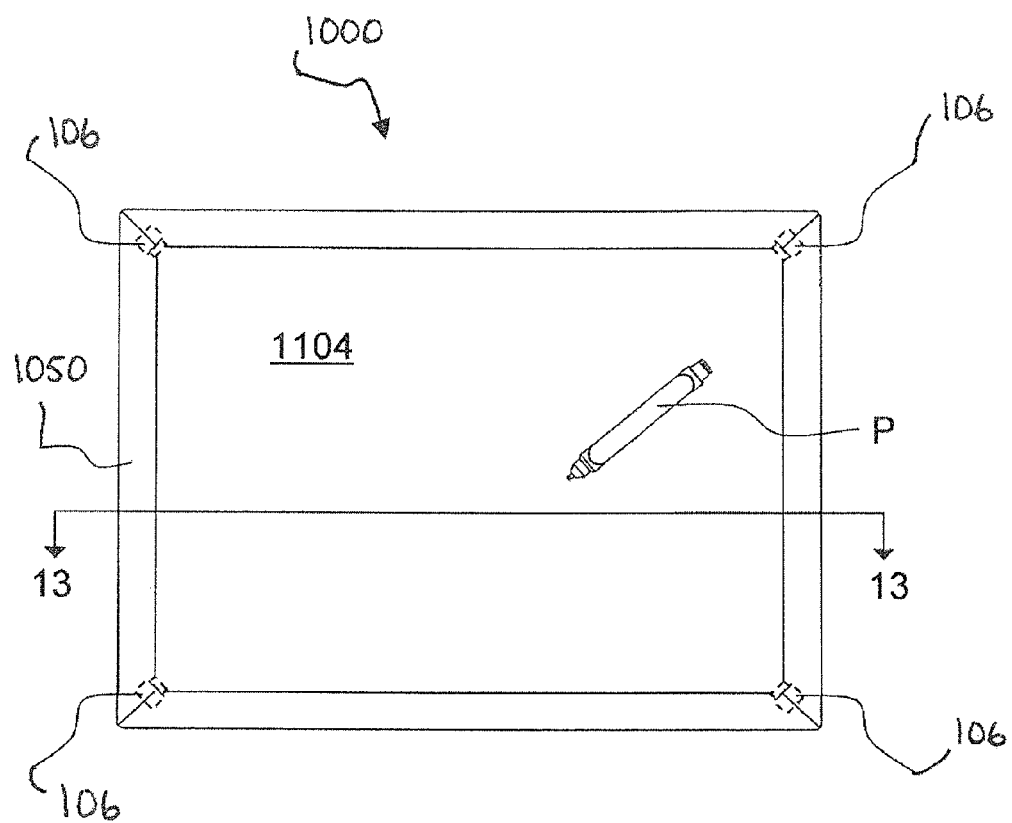
FIG. 12 is a schematic diagram of an interactive input system comprising yet another alternative pliable inflatable bezel.
Figure 13:
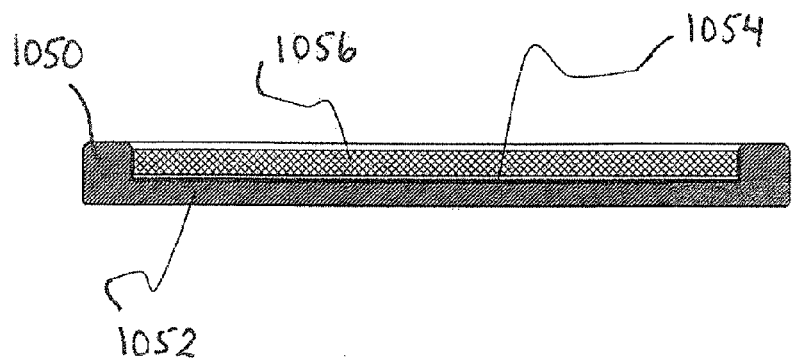
FIG. 13 is a cross-sectional view of FIG. 12 taken along lines 12-12.

FIGS. 12 and 13 show yet another inflatable bezel and imaging device assembly 1000. In this embodiment, the bezel 1050 is integrally formed with and surrounds an inflatable sheet 1052 having a surface 1054 bounded by the bezel that defines the touch surface. Imaging devices 106 are positioned adjacent and accommodated by each corner of the bezel. Cables extend from the imaging devices through the assembly to allow the imaging devices to be connected to the master controller 108. The inwardly facing surface of the bezel 1050 is coated with retro-reflective material 1056. In this embodiment, the bezel 1050 and inflatable sheet 1052 are filled with foam as described in U.S. Pat. No. 4,624,877 and U.S. Pat. No. 5,705,252 and are of similar composition to self-inflating mattresses such as the Therm-a-rest™ brand produced by Cascade Designs. When not in use, the inflatable sheet and bezel can be rolled into a deflated state.

In the embodiments described above, the inwardly facing surface of the bezel is described as being coated by retro-reflective material. If desired, rather than including a continuous retro-reflecting coating, one or more distinct bands of retro-reflective material may be provided on the inwardly facing surface of the bezel as described in U.S. Patent Application Publication No. 2009/0277694 to Hansen, et al. filed on May 9, 2008 and assigned to SMART Technologies ULC of Calgary, Alberta, the content of which is incorporated herein by reference. Alternatively, rather than using retro-reflective material, highly reflective material may be employed. The inwardly facing surface of the bezel may also be coated with material different than the retro-reflective material and highly reflective material referred to above. These coatings may comprise for example, a black coating, a light absorbing coating; a white coating, an energy reflecting coating; a film of electroluminescent or fluorescent material; a polarizing filter; an IR filter; or a combination or two or more of the aforementioned coatings. As long as the bezel provides a relatively constant background in relation to pointers brought into proximity of the touch surface 104, it will be suitable for use. As will be appreciated by those of skill in the art, depending on the coating(s) selected for the bezel, the IR light sources 180 of the imaging devices may or may not be required. To facilitate assembly of the interactive input system 100, regardless of the coating(s) selected for the bezel, opposite sides of the bezel may be coated in a substantially identical manner so that the bezel does not need to be oriented in any specific manner during assembly of the interactive input system 100.

To reduce the effects of ambient light, the light emitted by the light sources 180 may be modulated as described in U.S. Patent Application Publication No. 2009/0278794 to McReynolds, et al. filed on May 9, 2008 and assigned to SMART Technologies ULC of Calgary, Alberta, the content of which is incorporated herein by reference. To reduce the amount of data to be processed, only the area of the image frames occupied by the bezel need be processed. A bezel finding procedure similar to that described in the above-incorporated Hansen, et al. published U.S. patent application, may be employed to locate the bezel in captured image frames. Of course, those of skill in the art will appreciate that other suitable techniques may be employed to locate the bezel in captured image frames.

Although the support frame assembly 102 is described as being self-supporting, if desired, the support frame assembly can be configured to be attached to a display unit (not shown) such as for example, a plasma television, a liquid crystal display (LCD) device, a flat panel display device, a cathode ray tube monitor etc. and surrounds the display surface 124 of the display unit. In this case, the image data output by the general purpose computing device 110 is fed to the display unit obviating the need for the touch surface sheet or the projection device 112.

Alternatively, the support frame assembly may be configured to be attached to a support surface such as for example, a wall surface or the side of an emergency service or military vehicle. As will be appreciated in this case, the feet are removed from the legs and the length of the legs can be shortened.

Although the light sources of the imaging assemblies 180 are described as comprising IR LEDs, those of skill in the art will appreciate that the imaging devices may include different IR light sources. The light sources of the imaging assemblies alternatively may comprise light sources that emit light at a frequency different than infrared. As will be appreciated using light sources that emit non-visible light is preferred to avoid the light emitted by the light sources from interfering with the images presented on the touch surface 104.

Those of skill in the art will also appreciate that other processing structures could be used in place of the master controller and general purpose computing device. For example, the master controller could be eliminated and its processing functions could be performed by the general purpose computing device. Alternatively, the master controller could be configured to process the image frame data output by the image sensors both to detect the existence of a pointer in captured image frames and to triangulate the position of the pointer. Rather than using a separate master controller 108, the functionality of the master controller 108 may be embodied in the DSP 168 of one of the imaging devices. Although the imaging devices and master controller are described as employing DSPs, other processors such as microcontrollers, central processing units (CPUs), graphics processing units (GPUs), or cell-processors could be used.

Although embodiments have been described, those of skill in the art will appreciate that other variations and modifications may be made without departing from the spirit and scope thereof as defined by the appended claims.

What is claimed is:

1. An interactive input system comprising:
   at least one imaging device having a field of view looking into a region of interest;
   at least one radiation source emitting radiation into said region of interest;
   a pliable bezel at least partially surrounding said region of interest and comprising at least one strap, said bezel having a reflective surface in the field of view of said at least one imaging device, wherein said pliable bezel borders multiple sides of said region of interest; and
   a plurality of bezel guides at spaced locations about the periphery of said region of interest around which said at least one strap is partially wrapped, wherein each bezel guide in the field of view of said at least one imaging device is coated with a reflective material.

2. An interactive input system:
   according to claim 1 wherein one or more of said bezel guides comprises retaining structure to retain said bezel.

3. An interactive input system according to claim 1 wherein the reflective surface of said bezel and the reflective coating on each said bezel guide is retro-reflective.

4. An interactive input system according to claim 1 wherein said at least one radiation source comprises a light source.

5. An interactive input system according to claim 4 wherein said light source comprises one or more light emitting diodes (LEDs).

6. An interactive input system according to claim 5 wherein each LED is an infrared LED.

7. An interactive input system according to claim 4 wherein said light source is positioned adjacent said at least one imaging device.

8. An interactive input system according to claim 7 wherein said light source comprise one or more LEDs.

9. An interactive input system according to claim 8 wherein each LED is an infrared LED.

10. An interactive input system according to claim 1 further comprising processing structure communicating with said at least one imaging device and processing image data output thereby.

11. An interactive input system according to claim 10 wherein said region of interest is generally rectangular and wherein said bezel extends along multiple sides of said region of interest.

12. An interactive input system according to claim 11 wherein said bezel extends along three sides of said region of interest.

13. An interactive input system according to claim 12 comprising at least two imaging devices looking into said region of interest from different vantages and having overlapping fields of view.

14. An interactive input system according to claim 13 comprising a radiation source proximate each imaging device.

15. An interactive input system according to claim 14 wherein each said radiation source comprises one or more light emitting diodes (LEDs).

16. An interactive input system according to claim 15 wherein each LED is an infrared LED.

17. An interactive input system according to claim 10 wherein the reflective surface of said bezel is retro-reflective.

18. An interactive input system according to claim 17 wherein each bezel guide in the field of view of said at least one imaging device is coated with a retro-reflective material.

19. An interactive input system comprising:
    at least one imaging device having a field of view looking into a region of interest;
    at least one radiation source emitting radiation into said region of interest;
    a pliable bezel at least partially surrounding said region of interest and comprising at least one strap, said bezel having a reflective surface in the field of view of said at least one imaging device, wherein said pliable bezel borders multiple sides of said region of interest; and
    a plurality of bezel guides at spaced locations about the periphery of said region of interest around which said at least one strap is partially wrapped, wherein each bezel guide in the field of view of said at least one imaging device is substantially transparent.

20. An interactive input system comprising:
    at least one imaging device having a field of view looking into a region of interest;
    at least one radiation source emitting radiation into said region of interest;
    a pliable bezel at least partially surrounding said region of interest and comprising at least one strap, said bezel having a reflective surface in the field of view of said at least one imaging device, wherein said pliable bezel borders multiple sides of said region of interest; and
    a plurality of bezel guides at spaced locations about the periphery of said region of interest around which said at least one strap is partially wrapped, wherein each bezel guide is one of a cylindrical element, a curved element and a thin profile element.

21. An interactive input system comprising:
    at least one imaging device having a field of view looking into a region of interest;
    at least one radiation source emitting radiation into said region of interest;
    a pliable bezel at least partially surrounding said region of interest and comprising at least one strap, said bezel having a reflective surface in the field of view of said at least one imaging device, wherein said pliable bezel borders multiple sides of said region of interest; and
    a plurality of bezel guides at spaced locations about the periphery of said region of interest around which said at least one strap is partially wrapped, wherein each bezel guide comprises a plurality of bezel guide elements, the pliable bezel being interleaved between the bezel guide elements.

22. An interactive input system according to claim 21 wherein said at least one radiation source comprises a light source.

23. An interactive input system according to claim 22 wherein said light source comprises one or more light emitting diodes (LEDs).

24. An interactive input system according to claim 23 wherein each LED is an infrared LED.

25. An interactive input system according to claim 22 wherein said light source is positioned adjacent said at least one imaging device.

26. An interactive input system according to claim 21 further comprising processing structure communicating with said at least one imaging device and processing image data output thereby.

27. An interactive input system according to claim 26 comprising at least two imaging devices looking into said region of interest from different vantages and having overlapping fields of view.

28. An interactive input system comprising:
   at least one imaging device having a field of view looking into a region of interest;
   at least one radiation source emitting radiation into said region of interest;
   a pliable bezel at least partially surrounding said region of interest and comprising at least one strap, said bezel having a reflective surface in the field of view of said at least one imaging device, wherein said pliable bezel borders multiple sides of said region of interest;
   a plurality of bezel guides at spaced locations about the periphery of said region of interest around which said at least one strap is partially wrapped; and
   an adjustment mechanism cooperating with said pliable bezel to adjust the tension thereof.

29. An interactive input system according to claim 28 wherein said at least one radiation source comprises a light source.

30. An interactive input system according to claim 29 wherein said light source comprises one or more light emitting diodes (LEDs).

31. An interactive input system according to claim 30 wherein each LED is an infrared LED.

32. An interactive input system according to claim 29 wherein said light source is positioned adjacent said at least one imaging device.

33. An interactive input system according to claim 28 further comprising processing structure communicating with said at least one imaging device and processing mage data output thereby.

34. An interactive input system according to claim 33 comprising at least two imaging devices looking into said region of interest from different vantages and having overlapping fields of view.

35. An interactive input system comprising:
   at least one imaging device having a field of view looking into a region of interest;
   a pliable bezel at least partially surrounding said region of interest and comprising at least one strap, said bezel having a surface in the field of view of said at least one imaging device, wherein said pliable bezel borders multiple sides of said region of interest; and
   a plurality of bezel guides at spaced locations about the periphery of said region of interest around which said at least one strap is partially wrapped, wherein each bezel guide comprises a plurality of bezel guide elements, the bezel being interleaved between the bezel guide elements.

36. An interactive input system according to claim 35 further comprising processing structure communicating with said at least one imaging device and processing image data output thereby.

37. An interactive input system according to claim 36 wherein said region of interest is generally rectangular and wherein said bezel extends along multiple sides of said region of interest.

38. An interactive input system according to claim 37 wherein said bezel extends along three sides of said region of interest.

39. An interactive input system according to claim 36 comprising at least two imaging devices looking into said region of interest from different vantages and having overlapping fields of view.

40. An interactive input system comprising:
   at least one imaging device having a field of view looking into a region of interest;
   a pliable bezel at least partially surrounding said region of interest and comprising at least one strap, said bezel having a surface in the field of view of said at least one imaging device, wherein said pliable bezel borders multiple sides of said region of interest;
   a plurality of bezel guides at spaced locations about the periphery of said region of interest around which said at least one strap is partially wrapped; and
   an adjustment mechanism cooperating with said bezel to adjust the tension thereof.

41. An interactive input system according to claim 40 further comprising processing structure communicating with said at least one imaging device and processing image data output thereby.

42. An interactive input system according to claim 41 wherein said region of interest is generally rectangular and wherein said bezel extends along multiple sides of said region of interest.

43. An interactive input system according to claim 42 wherein said bezel extends along three sides of said region of interest.

44. An interactive input system according to claim 41 comprising at least two imaging devices looking into said region of interest from different vantages and having overlapping fields of view.

45. An interactive input system comprising:
   at least one imaging device having a field of view looking into a region of interest;
   a pliable bezel at least partially surrounding said region of interest and comprising at least one strap, said bezel having a surface in the field of view of said at least one imaging device, wherein said pliable bezel borders multiple sides of said region of interest;
   a plurality of bezel guides at spaced locations about the periphery of said region of interest around which said at least one strap is partially wrapped; and
   a plurality of imaging devices at different locations about the periphery of said region of interest.

46. An interactive input system comprising:
   a plurality of imaging devices at different locations about the periphery of a region of interest and having fields of view looking into said region of interest; and
   a pliable inflatable bezel at least partially surrounding said region of interest and having a surface in the field of view of said imaging devices, wherein said bezel accommodates said imaging devices, wherein said pliable bezel borders multiple sides of said region of interest, and wherein the surface of said bezel has a coating thereon selected from retro-reflective material, highly reflective material, light absorbing material, energy reflecting material, electroluminescent material, fluorescent material, polarizing filter material, or infrared filter material, and combinations thereof.

47. An interactive input system according to claim 46 wherein said bezel is self-inflating.

48. An interactive input system according to claim 46 wherein said bezel further comprises a valve member.

* * * * *